Sept. 30, 1969   A. B. LANE   3,469,998
FOOD PACKAGE
Filed Nov. 4, 1965
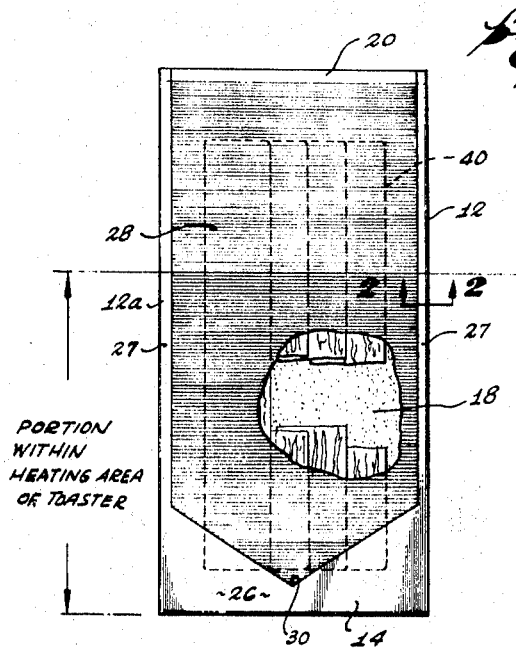
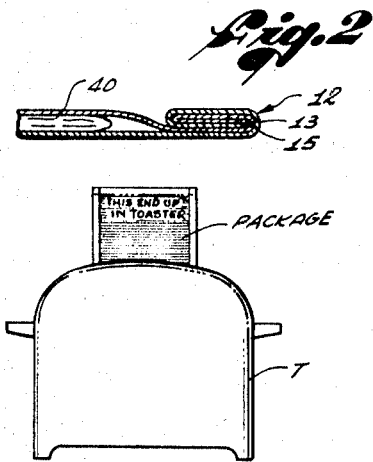
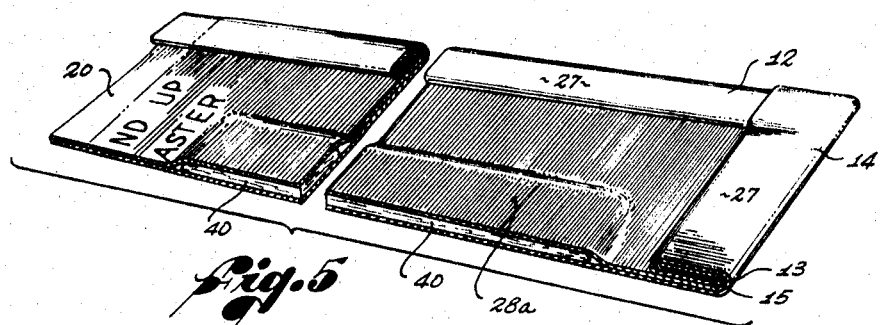
INVENTOR.
ALAN B. LANE
BY Fulwider, Patton, Rieber,
Lee, and Utecht
ATTORNEYS

United States Patent Office 3,469,998
Patented Sept. 30, 1969

1

3,469,998
FOOD PACKAGE
Alan B. Lane, Northridge, Calif., assignor to Reddi-Bacon, Inc., Los Angeles, Calif., a corporation of California
Filed Nov. 4, 1965, Ser. No. 506,349
Int. Cl. B65d 85/36; B65b 65/42
U.S. Cl. 99—171                                    10 Claims

ABSTRACT OF THE DISCLOSURE

A package for food which is insertable into a toaster and which includes a wrapping of heat-resistant sheet material enclosing the food. The exterior surface of the sheet material is partially coated with heat-resistant material and the remainder of the exterior surface is coated with heat-absorbent material in a predetermined pattern so that the food is heated substantially uniformly to prevent overcooking and undercooking of portions of the food. The interior surface of the sheet material may be provided with a sanitary layer of inert, heat-fusible plastic material.

---

This invention relates to improvements in packages especially adapted for use in heating food contained within the package by means of external radiant heat, and specifically relates to improvements in foil packages to be heated in the ordinary domestic bread toaster.

The ordinary bread toaster operates in one of two main ways. First, it may operate on an automatic, adjustable, time-control cycle. Thus, if the user wishes bread toasted at any point between "light" and "dark," he merely sets an indicator at the desired point which adjusts the residence time of the bread in the toaster. More recently, a second main type of toaster has been designed which operates on the premise that the bread is to be toasted to a particular temperature. No automatic time control is present in such a toaster. In toasters of the second type, the control is obtained then essentially by measurement of temperature, through a radiant energy emission sensing device or means, rather than by a time control. See, for example, Patent No. 2,459,169 to Koci, entitled "Radiation Thermostat Control for Toasters."

In a copending patent application, owned by the assignee of the present invention, entitled Packaged Food Product, Ser. No. 411,740, filed Nov. 17, 1964, inventors, Marcus (nmi) Lipsky and William J. Mahan, a food package is described, adapted especially for containing precooked sliced bacon strips. The package is elongated and rectangular in shape, and has dimensions of approximately 3–4" in width by 7–8" in length, and is substantially thinner than the conventional toaster slot (which is about 1" in width). The package dimensions, mode of precooking the bacon for use in the foil packet, means for insulating the raw edges of the foil packet described in said patent application Ser. No. 411,740 are all common to the improved package, here to be described, and the disclosure of said patent application Ser. No. 411,740 is hereby incorporated by reference in the present patent application.

It has been found that the use of a foil packet, containing food, overcoated with a clear or darkened plastic resin to prevent electrical short circuiting, as set forth in said copending patent application Ser. No. 411,740, is completely operable in the toaster of the time-control or radiant control type. Because the upper end of the elongated foil packet extends above the toaster proper by at least several inches, it has been found, however, that there exists a quite substantial temperature gradient between the bottom portion of the packet, closely adjacent the heating coils of the toaster, and the upper portion of the packet extending above the toaster proper. This temperature differential was found to be as much as 240–300° F. for certain toaster cycles, and was the main reason why the bacon strips, on frequent occasion, were burned at the bottom and undercooked at the top. Thus, by way of example, in a time-controlled toaster cycle of 105 seconds, the bottom temperature of the bacon strip attained a temperature of 550° F., whereas the top temperature measured 270° F. The bacon was burned at the bottom and was limp (but hot) in its top portions and slightly undercooked.

When the same foil packet, whose surface is blackened, is heated in a radiation-sensitive control type of toaster, the radiation-sensing device will be measuring a surface whose emissivity is approximately equal to that of a properly toasted piece of bread. The radiation-sensing device will therefore trigger the pop-up mechanism when the surface of the foil packet is at the temperature of a properly toasted slice of bread. A temperature differential between top and bottom of the packet, however, still exists, even though this temperature differential may be less than that existing in the time-control toasters.

Bearing in mind the foregoing facts, it is a major object of the present invention to heat metal foil packets, a portion of which may extend above the toaster proper, and which contains food, in a toaster more uniformly than has been hitherto accomplished.

It is another object of the present invention to more uniformly heat an aluminum foil packet in a toaster, a portion of which extends above the toaster, in a simple and inexpensive manner.

These and other objects of the invention will become clear from the following description, and from the drawings, wherein:

FIGURE 1 is a plan view of my novel food package;

FIGURE 2 is a fragmentary cross-sectional view taken along the line 2—2 of FIGURE 1;

FIGURE 3 is a side elevational view of my novel package as seen inserted in a toaster during its heating cycle;

FIGURE 4 is a view of the components of my novel package just prior to the formation of the package proper; and FIGURE 5 is an enlarged cross-sectional view of my completely formed novel package taken along the longitudinal axis thereof, the reverse side of the package as shown in FIGURE 1 being shown here.

In general, the improved food package of my invention comprises a pair of superposed foil sheets, each coated on the normally unexposed side with a plastic coating, for reasons to be later explained, and further coated on the normally exposed side with a heat-insulative coating covering the surface of the foil but not the edges of the foil. (The raw edges need not be coated as they are double folded and thereby not exposed, as described in the said pending application Ser. No. 411,740, and as will be described briefly hereinafter.)

Both the exposed surfaces of the foil are darkened, so as to be heat absorbent, over a major portion of the area, which is to assume the uppermost position in the toaster, above the actual toaster heating zone, and a substantial portion, i.e., from about 5% to about 50% of the total exposed surface area, within the actual toaster heating zone, is colored or coated white, off-white, or some other coloring of a heat-reflective nature. From the point of view of economy, it has been found that essentially all of the heat-reflective surface coating may be placed only on one exposed surface and the total coated heat-reflective area on the one surface runs, preferably, from about 10% to about 50% of the area within the actual toaster heating zone.

It has been found that food contained within a package, as described, will be heated by radiant heat substantially more uniformly than has been hitherto possible. The prior art, of which I am familiar, has been aware of improvements provided by wrapping food in foil, the exposed surfaces of which are coated with heat-absorbent or infra-red absorbent coatings. Such wrappings or packagings for food provide improvements over bare foil, or foil electrically insulated with clear plastic (e.g., phenolic) overcoatings especially when inserted in toasters operating on the radiant control principle. However, the temperature differential between bottom and top of the overall darkened elongated package is still several hundred degrees, or more, as stated earlier, and frequently results in a burning of the hotter portions and under-cooking of the cooler (upper) portions. The novel package following the concepts of my invention reduces this temperature differential very substantially, as will be seen from the following detailed description.

The presently preferred embodiment of my invention is shown in FIGURE 1, and comprises a pair of superposed sheets or sheet foil of aluminum or other metal foil 10, the pair of sheets having been double folded along the side edges 12, 12a (see FIGURE 2) and double folded also along the bottom edge 14 (see FIGURE 5).

The superposed sheets of foil 10 are generally of between 10 mils to 35 mils in thickness and enclose full length bacon strips 40, by way of example only. Each sheet 10 is coated on its interior surface with one of many types of inert, plastic, heat-fusible coatings which prevent metal-to-food contact. For example polyvinyl chloride or polyethylene resins may be used. The interior coating, designated 18 in FIGURE 1, has a thickness in the preferred range of 0.1 mil to about 1 mil. The interior coating 18 also permits the upper edge 20 of the package to be sealed by heating so as to fuse the interior coating at the edge 20.

The exterior, exposed, surfaces of the package are coated with both dark and light heat-resistant, electrically insulated, plastic coatings, e.g., a pigmented epoxy resin.

For purposes of this application and claims, a heat-reflective surface is defined as a surface having a diffuse reflecting power in the infra-red wave-length region encountered within the toaster of about 65% or higher. A heat-absorptive surface is defined as a surface having a diffuse reflecting power in the infra-red wave-length region encountered within the toaster of 30% or less.

In the alternative, a clear plastic coating may be employed which is then overcoated with dark and light heat-resistant inks or coatings in the manner of distribution heretofore set forth. Among other usable plastic coatings are various types of polyester and alkyd materials. These heat-resistant, electrically insulative, metal adhering plastic or plastic coatings and/or inks, generally are laid down, by conventional methods, on the metal foil 10 in thicknesses ranging from about 0.5 mil to about 3 mils. The heat resistance of the inks and/or coatings must be sufficient to withstand heat generated within the toaster over the maximum times encountered, i.e., about 2 minutes for precooked bacon strips.

The coated foil, just described, generally has uncoated raw edges 13, 15 (see FIGURES 2 and 5) and while these edges may be coated with an insulative coating of epoxy resin, by dipping or the like, the complete coating of these edges proceeds with some difficulty. For this reason, the completed packaged of this invention is generally formed with the raw edges 13, 15 of the initial piece of coated foil left in its uncoated state, but folded and otherwise manipulated in such a manner as to prevent the raw edges 13, 15 from contacting the heating coils or other metal elements of a toaster.

The colorants in the plastic coatings of the overcoating inks employed do not form part of this invention in and of themselves. It is of great importance, of course, that the dark heat-absorbent areas and the light heat-reflective areas on the surface of the foil be properly distributed. It has been found, experimentally, that an excellent distribution of heat is obtained when a V-shaped overcoating of white, heat-reflective material, designated by the numeral 26, is applied to one surface only exposed to the heating elements of the toaster. The bulk of the remainder of the exposed surface is colored darkly so as to be heat-absorbent. The heat-absorbent coated area is designated by the numeral 28 on the rear face of the package shown in FIGURE 1, and is designated by the numeral 28a on the front face of the package shown in FIGURE 5. Numerically speaking, the temperature differential between top and bottom of this type of package has been reduced to as low as approximately 65° F., in comparison with a temperature differential of 105° F. found in a package which was coated darkly overall with the identical dark coating as used in the dark portions 28/28a of the package of my invention. See the data in Table II set forth hereafter.

The aforedescribed reduction in temperature differential within the package of my invention occurred in toasters operating on a 90 second time control and also occurred in toasters operating on radiant control cycles.

The V-shaped, heat-reflective design specifically shown on the rear surface of the package in FIGURE 1 is 1½" in length at the side edges 12, 12a of the package, and is ½" in length at its central low point 30. Since the package has an overall width of about 4" and an overall height of 8" and extends above the usual toaster about 3", the total amount of surface area of the toaster is about 40 square inches. Since the heat-reflective surface in this particular embodiment is coated upon only one face of the package, the total heat-reflective surface within the toaster proper constitutes approximately 10% of the total surface within the toaster, or, approximately 20% of one exposed surface.

It has been determined that effective results, in terms of reduction in temperature differential, are obtained when only one exposed foil surface is treated so as to have a combination of heat-absorbent and heat-reflective characteristics. Further, it is found that the heat-reflective surface should cover between about 5% to about 50% of the total surface residing within the toaster for substantially greater reduction in top to bottom temperature differential to occur.

The side edges 12, 12a of the package, and the lower edge 14 are preferably made heat-reflective also in order to avoid burning of the edges of the strips of bacon 40 that are closest to the sides and bottom of the package. Preferably, as shown in FIGURE 1, the heat-reflective area 27 along the lower edge 14 is continuous between the side edges 12, 12a to ensure a relatively uniform temperature along the lower edge and to facilitate conduction of heat away from the lower edge.

The bacon at the sides of the package (and at the lower end) will become hotter because of greater heat transfer due to greater conduction and radiation from the foil to the bacon. The heat-reflective coating (e.g., white epoxy resin) on the side edges and lower edge 12, 12a and 14, respectively, is designated by the numeral 27. As will be seen from FIGURES 1 and 5, the heat-reflective edge strips are applied to both front and rear faces of the package for best results.

The V-shape pattern of heat-reflective surface, as shown and described, preferably extends out to the periphery of the package so that the edge strips 27 are merely continuations of the V-configuration. This combination of heat-reflective areas and heat-absorbent areas is presently the preferred embodiment of my invention.

It will be noted that the heat-reflective pattern need be applied to only one surface before folding, and that upon folding of the edges, both the surfaces of the folded edges are heat-reflective.

While the particular V-pattern of reflectivity shown in FIGURE 1 is considered to be optimum at the present time, it will be understood that a great many light (heat-reflective) and dark (heat absorbent) patterns are utilizable to reduce the temperature differential, in comparison to those packages colored solid overall, provided the principles of the invention are followed. Thus, arcuate areas of heat reflectivity, sunburst effects, or shallower V-shapes covering up to 50% of the surface of the package within the toaster may be successfully employed to substantially reduce the temperature differential. If more than about 50% heat-reflectivity is applied, it is found that the temperature differential between top and bottom increases.

By way of a specific example illustrating the very substantial improvements provided by the present invention, two pairs of bacon packages were compared in the same toasters. Each package was constructed of 0.0015 inch aluminum foil and coated interiorly in accordance with the description set forth herein. One package (package A) was externally colored with a dark blue epoxy coating over both of its exposed surfaces, and the other package (package B) was colored with the same heat-absorbent coating entirely over one surface and the other surface was coated with the same dark heat-absorbent material, except for a white pigmented epoxy heat-reflective coating in the pattern described and shown with reference to FIGURES 1–5. The packages were otherwise identical. The heat-absorbent and heat-reflective coatings had a diffuse reflecting power of about 25% and 70%, respectively, in the area of between about 7000 Angstroms to about 10,000 Angstroms.

One set of packages A and B was compared in a toaster operating on a time control and the other set of packages A and B was compared in a toaster operating on a radiant control. The results are set forth below in Tables I and II, respectively.

sealed edges have exposed raw edges, but are not in the area of the heating coils of the toaster. This is illustrated in FIGURE 3, where the upper edge 20 of the package is at least several inches above the top of the conventional toaster top, while the toaster T is in the operating mode. Thus, the package is completely electrically insulated from the toaster.

While a presently preferred embodiment of my invention has been shown and described, it will also be appreciated from the foregoing description that many modifications exist which fall within the scope of the invention. I intend, therefore, to be bound only by the scope of the claims that follow.

I claim:

1. A package of food insertable into a toaster which includes:
   a food product; and
   a wrapping of metal foil sheet material surrounding and enclosing said food product thereby forming a package, the exterior surface of said sheet material having a heat-reflective area of between 5% to about 50% of that portion of the exterior surface of said package which is adapted to be contained within said toaster when said toaster is in operating position, and the remaining area of the exterior surface of said sheet material contained within said toaster when said toaster is in operating position having been treated with heat-absorbent material, said heat reflective area and said heat absorbent area being distributed in a predetermined manner over said exterior of said surface of said sheet material so that said food product is heated substantially uniformly to prevent overcooking and undercooking of portions of said food product.

2. The package of food according to claim 1 wherein said sheet material is composed of metal foil having an interior heat fusible, inert plastic coating and both said

TABLE I [1]

| Package | Time (sec.) | Temperature, °F., thermocouple 1½″ from— | | Condition of bacon | | |
|---|---|---|---|---|---|---|
| | | Bottom | Top | Bottom | Center | Top |
| A | 105 | 550 | 270 | ½–1½ in. burnt. | Very crisp | ½ in. limp but hot. |
| B | 105 | 380 | 290 | Crisp, very crisp. | Crisp | Crisp. |

TABLE II [1]

| Package | Time (sec.) | Temperature, °F., thermocouple 1½″ from— | | Condition of bacon | | |
|---|---|---|---|---|---|---|
| | | Bottom | Top | Bottom | Center | Top |
| A | 69 | 360 | 255 | Slightly burnt | Crisp/medium | Medium/limp. |
| B | 79 | 330 | 265 | Crisp/medium | do | Do. |

[1] Toaster used: General Electric Toaster Model T-132.

From the foregoing data and discussion, the advantages of the combination of heat-reflective and heat-absorbent surfaces on the foil package containing food are apparent. Attention is particularly drawn to my relatively flat, elongated package containing bacon or other food and comprising superposed foil sheets, both interiorly and exteriorly coated where the exterior coating is heat-reflective over at least about 10% of one side of the surface of the package contained within the toaster. As previously noted, the reflective coating may be applied to both the front and rear surfaces of the package, as well.

Attention is also drawn to the side edges 12, 12a of my package. These edges are formed by double folding, as mentioned, as shown particularly in FIGURES 2 and 5, and in this manner the raw edges 13, 15 of the foil 10, which are uncoated, are enveloped in electrically insulating material. The lower or bottom edge 14 is also double folded (see FIGURE 5, especially). The upper heat heat-reflective and said heat-absorbent areas of said sheet material comprising a coating which is electrically insulative and heat-resistant.

3. The package of food of claim 1 wherein said food product comprises a plurality of pre-cooked bacon strips.

4. The package of claim 2 wherein said inert inner plastic coating is polyvinyl chloride, and said exterior coating is an epoxy resin.

5. The package of claim 2 wherein said interior coating has a thickness of between ⅒ mil to about 1 mil, said metal foil has a thickness of between 10 mils to 35 mils, and said exposed surfaces are treated with a coating having a thickness of between about ½ mil to about 3 mils.

6. The package of claim 1 wherein said heat-reflective area covers between about 10% to about 50% of the surface of one side of said package contained within the toaster during its heating cycle.

7. The package of claim 6 wherein said heat-reflective area extends from edge to edge of said package in a continuous path.

8. The package of claim 6 wherein said heat-reflective area is bounded, in part, by the side edges of said package and the bottom edge of said package.

9. The package of claim 6 wherein said heat-reflective area is bounded on three sides by the two side edges of said package and the bottom edge of said package, and the remaining boundary line has a generally V-shaped configuration.

10. The package of claim 1 wherein said heat-reflective area includes a portion extending along substantially the entire length of the side edges of both sides of said package.

References Cited

UNITED STATES PATENTS

| | | |
|---|---|---|
| 2,465,841 | 3/1949 | Bonini. |
| 2,609,301 | 9/1952 | Lindsey _____ 99—174 |
| 2,807,550 | 9/1957 | Zarotschenzeff et al. __ 99—174 |
| 2,902,396 | 9/1959 | Reynolds _____ 99—174 X |
| 2,912,336 | 11/1959 | Perino _____ 99—174 |
| 3,185,372 | 5/1965 | Ferraro. |

HYMAN LORD, Primary Examiner

U.S. Cl. X.R.

99—174; 206—46; 229—3.5